(12) United States Patent
Carlbom et al.

(10) Patent No.: US 7,580,912 B2
(45) Date of Patent: Aug. 25, 2009

(54) PERFORMANCE DATA MINING BASED ON REAL TIME ANALYSIS OF SENSOR DATA

(75) Inventors: Ingrid Birgitta Carlbom, Summit, NJ (US); Yves D. Jean, New York, NY (US); Agata Opalach, Antibes (FR); Gopal S. Pingali, Mohegan Lake, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 691 days.

(21) Appl. No.: 10/167,533

(22) Filed: Jun. 12, 2002

(65) Prior Publication Data

US 2003/0023612 A1 Jan. 30, 2003

Related U.S. Application Data

(60) Provisional application No. 60/299,355, filed on Jun. 19, 2001, provisional application No. 60/299,335, filed on Jun. 19, 2001, provisional application No. 60/297,539, filed on Jun. 12, 2001.

(51) Int. Cl.
  G06E 1/00 (2006.01)
  G06E 3/00 (2006.01)
  G06G 7/00 (2006.01)
  G06F 17/00 (2006.01)
  G06F 15/18 (2006.01)
  G06F 15/00 (2006.01)
  G06N 5/04 (2006.01)
(52) U.S. Cl. .................. 706/62; 706/21; 706/60
(58) Field of Classification Search .............. 707/104.1, 707/102, 1; 348/154, 159, 152; 706/933, 706/20, 10, 44, 15
See application file for complete search history.

(56) References Cited

U.S. PATENT DOCUMENTS

| 5,764,283 | A | | 6/1998 | Pingali et al. |
| 5,786,814 | A | * | 7/1998 | Moran et al. ................. 715/720 |
| 6,028,626 | A | * | 2/2000 | Aviv ........................... 348/152 |
| 6,029,176 | A | * | 2/2000 | Cannon .................... 707/104.1 |
| 6,044,366 | A | * | 3/2000 | Graffe et al. .................... 707/2 |
| 6,069,655 | A | * | 5/2000 | Seeley et al. ................. 348/154 |
| 6,134,555 | A | * | 10/2000 | Chadha et al. .............. 707/102 |
| 6,141,041 | A | | 10/2000 | Carlbom et al. |
| 6,212,526 | B1 | * | 4/2001 | Chaudhuri et al. .......... 707/102 |
| 6,233,007 | B1 | * | 5/2001 | Carlbom et al. ............. 348/157 |
| 6,286,005 | B1 | * | 9/2001 | Cannon ....................... 707/100 |
| 6,441,846 | B1 | | 8/2002 | Carlbom et al. |

(Continued)

FOREIGN PATENT DOCUMENTS

JP 10-301942 * 11/1998

OTHER PUBLICATIONS

Kurt Thearling, "Increasing Customer Value by Integrating Data Mining and Campain Management Software", Direct Marketing Magazine, Feb. 1999.*

(Continued)

*Primary Examiner*—David R Vincent
*Assistant Examiner*—Peter Coughlan

(57) ABSTRACT

A performance data mining system combines detailed sensor analysis data with other data sources to discover interesting patterns/rules for performance and utilizes real time sensor analysis to dynamically derive mining results in real time during an event. The system automatically generates advice/strategy and predictions based on specified criteria.

24 Claims, 5 Drawing Sheets

U.S. PATENT DOCUMENTS

| | | | |
|---|---|---|---|
| 6,513,003 B1 * | 1/2003 | Angell et al. | 704/235 |
| 6,571,193 B1 * | 5/2003 | Unuma et al. | 702/141 |
| 6,629,095 B1 * | 9/2003 | Wagstaff et al. | 707/5 |
| 2003/0023595 A1 | 1/2003 | Carlbom et al. | |
| 2003/0033318 A1 | 2/2003 | Carlbom et al. | |
| 2003/0142210 A1 | 7/2003 | Carlbom et al. | |

OTHER PUBLICATIONS

P.H. Kelly et al., "An Architecture for Multiple Perspective Interactive Video," Proceedings of ACM Multimedia, pp. 201-212, 1995.

R.Y. Tsai, "An Efficient and Accurate Camera Calibration Technique for 3D Machine Vision," Proceedings of the IEEE Conference on Computer Vision and Pattern Recognition, pp. 364-374, 1986.

* cited by examiner

PERFORMANCE DATA MINING BASED ON REAL TIME ANALYSIS OF SENSOR DATA

CROSS REFERENCE TO RELATED APPLICATIONS

This application claims priority to U.S. provisional patent applications identified as Ser. No. 60/299,355 filed on Jun. 19, 2001 and entitled "Performance Data Mining Based on Real Time Analysis of Sensor Data;" Ser. No. 60/299,335 filed on Jun. 19, 2001 and entitled "Instantly Indexed Databases for Multimedia Content Analysis and Retrieval;" and Ser. No. 60/297,539 filed on Jun. 12, 2001 and entitled "Method and Apparatus for Retrieving Multimedia Data Through Spatio-Temporal Activity Maps," the disclosures of which are incorporated by reference herein.

This application relates to U.S. patent applications identified as Ser. No. 10/167,534 entitled "Instantly Indexed Databases for Multimedia Content Analysis and Retrieval"; and Ser. No. 10/161,539 entitled "Method and Apparatus for Retrieving Multimedia Data Through Spatio-Temporal Activity Maps," filed concurrent with the present application on Jun. 12, 2002, and the disclosures of which are incorporated by reference herein.

FIELD OF THE INVENTION

The present invention relates to data mining techniques and, more particularly, to techniques for providing performance data mining based on analysis of sensor data, including real time analysis.

BACKGROUND OF THE INVENTION

It is important in many security, surveillance, sports and other applications to be able to detect patterns of activities from an event associated with the application such that someone observing the patterns can draw useful insight about the activities and about those individuals participating in the activities. To date, this has typically only been possible via manual review and analysis of live or recorded video that captures the event activity.

While not the only application in which this need is important, sporting events provide a good illustration of such a need. It is known that sporting events are the most popular form of remote live entertainment in the world, attracting millions of viewers on television, personal computers, and a variety of other devices. Sports have an established and sophisticated broadcast production process involving producers, directors, commentators, analysts, and a sizeable crew of video and audio technicians using numerous cameras and microphones.

In recent years, computer-generated visualizations have been increasingly used in sports production to further enhance the viewer experience. Interactive visualization is becoming even more important with the ongoing convergence of television and Internet broadcasting. These trends have led to a significant amount of work on sports analysis, visualization, and interactive video browsing.

Most of the existing work related to sports visualization falls into two categories, which attempt to significantly enhance the experience of the event: (1) overlay of virtual objects over video using augmented reality techniques (examples of these include the virtual first-down line in football or the virtual offside line in soccer); and (2) generation of virtual renderings of action.

However, the emphasis of these existing visualization techniques has primarily been on re-synthesizing the sport, and not on deeper analysis of the sport. As mentioned above, the sports viewer, commentator, analyst, player, or coach is often trying to obtain further insight into performance, style, and ultimately strategy. In the context of a security or surveillance application, an observer gains insight by attempting to detect security problems/situations by viewing individuals, objects and activities associated with the live or recorded video feed that he/she is observing. Unfortunately, such ability to gain insight into aspects of an event is not possible with existing techniques and systems.

Thus, there exists a need for techniques that overcome the above mentioned drawbacks by providing automated performance data mining associated with a domain-specific event based on real time analysis of sensor data captured in accordance with the domain-specific event.

SUMMARY OF THE INVENTION

The present invention provides techniques for automated performance data mining associated with a domain-specific event based on analysis of sensor data captured in accordance with the domain-specific event. Preferably, such analysis is performed in real time.

The performance data mining techniques of the invention may combine sensor analysis data with other data sources stored in a database to discover interesting patterns and/or rules associated with the event. Advantageously, the techniques utilize real time sensor analysis to dynamically derive mining results in real time during an event. These results may be used to retrieve and/or visualize multimedia data associated with the event. In addition to patterns and/or rules, automated advice (recommendations) and predictions may also be generated in accordance with these data mining techniques. The mined results may relate to a measure of performance, style and/or strategy associated with an aspect of the domain-specific event, e.g., a player in tennis match. Further, new results associated with the domain-specific event may be determined based on user interaction with one or more visual representations of the domain-specific event.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention while making reference to exemplary real world domains such as security, surveillance and sporting events. However, it is to be understood that the invention is not limited to use with any particular domain or application. The invention is instead more generally applicable to any application in which it is desirable to be able to automatically mine patterns of activities from data associated with the application and to automatically generate advice and/or predictions based on such data mining, such that a user can draw useful insight about the activities and about those individuals participating in the activities.

Also, while the term "media" (particularly in the form of video) is used in the illustrative descriptions to follow, it is to be understood that the teachings provided herein equally apply to "multimedia" data, that is, multiple forms of data that may be captured from multiple sensor types. For example, multimedia data may include, but is not limited to, video data, audio data, infrared data, geophone-based data, temperature data, and/or combinations thereof, collected from multiple sensors.

Figure 1:
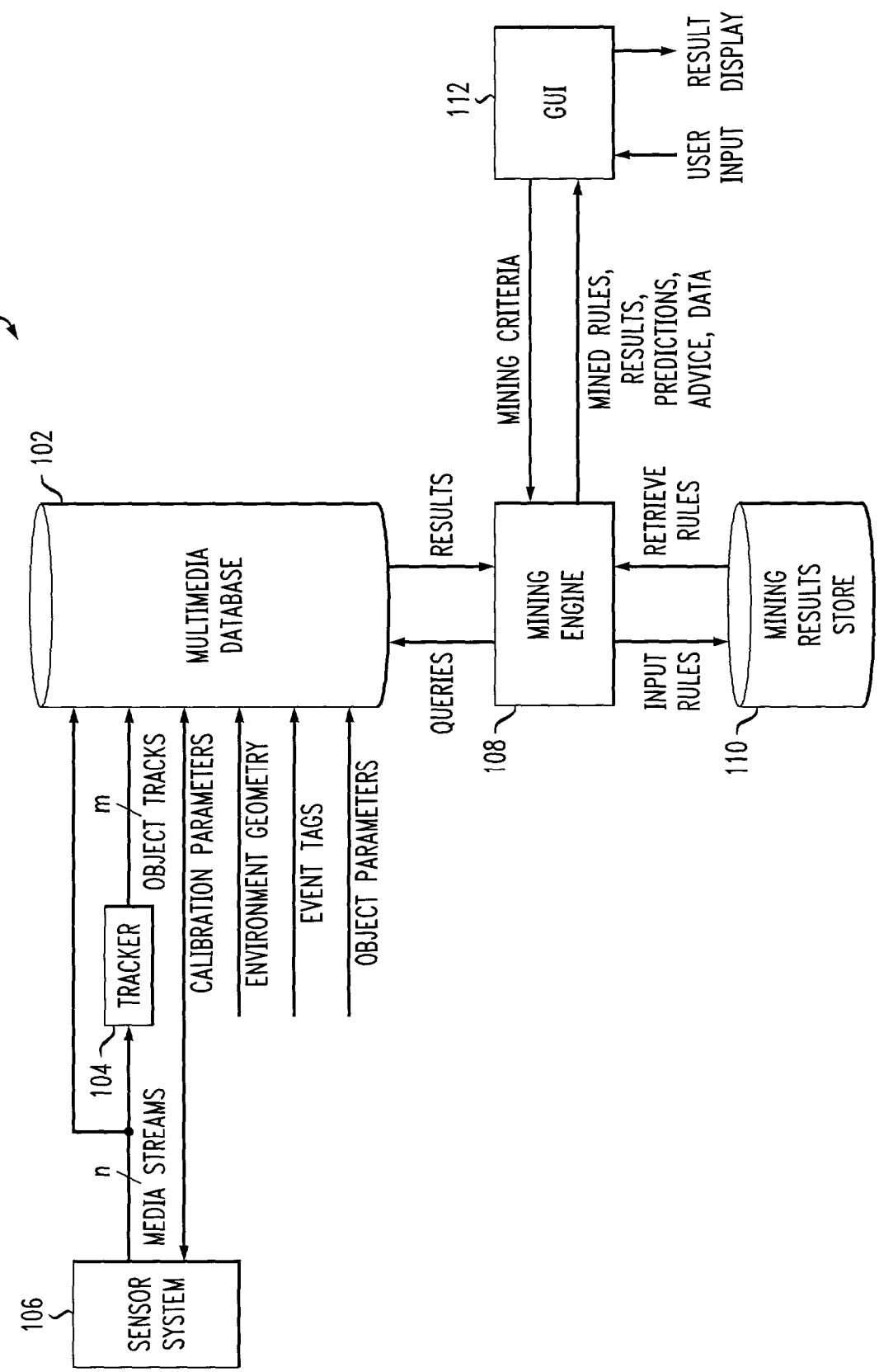
FIG. 1 is a block diagram illustrating a performance data mining system according to an embodiment of the present invention.

Referring initially to FIG. 1, a block diagram illustrates a performance data mining system according to an embodiment of the present invention. As shown, the performance data mining system 100 comprises a multimedia database 102, a tracker module 104, a sensor system 106, a mining engine 108, a mining results store 110, and a graphical user interface (GUI) 112. The performance data mining system operates as follows.

Multiple media streams from one or more sensors (not shown) associated with sensor system 106 are stored (optionally compressed) in multimedia database 102. It is to be understood that the sensors are preferably observing a domain-specific scene or event associated with the application in real time. For example, the scene or event may be a tennis match that is occurring live. In any case, the sensors may include, but are not limited to, one or more video cameras, microphones, temperature sensors, infrared sensors, and/or geophones. Thus, as mentioned, the captured media may include video data, audio data, infrared data, geophone-based data, temperature data, and/or combinations thereof.

Next, analysis is performed on these incoming streams to detect and track objects moving in the scene. This analysis is performed by tracker module 104. By way of example, the tracker module 104 may implement the object (e.g., persons and items) tracking and analysis techniques described in U.S. Pat. Nos. 5,764,283 and 6,233,007, and in the U.S. patent application identified as Ser. No. 10/062,800 filed Jan. 31, 2002 and entitled "Real Time Method and Apparatus for Tracking a Moving Object Experiencing a Change in Direction," the disclosures of which are incorporated by reference herein. However, other tracking and analysis techniques may be used.

The analysis results in object tracks which represent the motion of objects in the scene. The resultant object tracks from the various media streams are stored along with object labels in the multimedia database 102. The tracks consist of sequences of spatio-temporal coordinates. All time codes in the system are referenced to a calibrated time source.

Further, as shown in FIG. 1, additional data is stored in the database 102. For example, calibration parameters of all the sensors associated with the sensor system 106 are stored in the database 102 to facilitate mapping of trajectories from image coordinates to world coordinates. In addition, the database 102 stores the geometry of the environment (associated with the event or scene being monitored) and the location and geometry of known landmarks in the environment. Some dynamic event-related information is also stored in the database 102. This includes well-known and available event tags that describe specific events or sub-events of a particular event. Other information stored in the database 102 includes further descriptions of specific objects and relationships between objects.

Thus, analysis of sensor data, sensor streams, object parameters and event tags are stored into multimedia database 102 which forms a rich representation of a real world event, such as a sporting event, a theater performance, activity of people in a retail store, etc.

As will be illustrated below, the performance data mining system 100, via the mining engine 108, combines the detailed sensor analysis data with the other data sources, as described above, to discover interesting patterns/rules for performance, and utilizes real time sensor analysis to dynamically derive mining results in real time during an event.

In a preferred embodiment, the mining engine 108 interfaces with (accesses) the instantly indexed database described in the concurrently filed U.S. patent application identified as Ser. No. 10/167,534 entitled "Instantly Indexed Databases for Multimedia Content Analysis and Retrieval". That is, the multimedia database 102, tracker module 104 and sensor system 106 may be implemented as described in patent application Ser. No. 10/167,534. However, the performance data mining techniques of the invention are not limited to use with a particular database and, therefore, may be implemented with other database systems.

The present invention provides techniques and mechanisms to discover interesting patterns from this multimedia database through mining engine 108. The mining engine 108 searches the database based on user-specified mining criteria. The mining engine 108 outputs discovered patterns to the mining results store 110 that stores the discovered patterns. The mining engine 108 uses the pre-discovered rules/patterns in the mining results store 110 along with more recent/other data in the multimedia database 102 to generate outputs to the user based on the user-specified criteria.

The graphical user interface (GUI) 112 receives input from the user and specifies mining criteria to the mining engine 108 based on the user-specified criteria. The GUI 112 also receives the results from the mining engine 108 and displays them in an appropriate form to the user. The results from the mining engine 108 include discovered patterns/rules, predictions on outcome, advice/success recipes, and multimedia data corresponding to a mined rule. The graphical interface 112 may visualize the retrieved results in an interactive visualization, for example, as described in the concurrently filed U.S. patent application identified as Ser. No. 10/161,539 entitled "Method and Apparatus for Retrieving Multimedia Data Through Spatio-Temporal Activity Maps". The performance data mining system of the invention may also employ the techniques described in the U.S. patent application identified as Ser. No. 09/100,948 filed Jun. 22, 1998 and entitled "Method and Apparatus for Deriving Novel Sports Statistics from Real Time Tracking of Sporting Events," the disclosure of which is incorporated by reference herein.

The mining engine 108 serves as a central controller of operations associated with the performance data mining system 100 and thus performs several functions. These functions will be described in detail below in the context of FIGS. 2 through 5.

First, the mining engine 108 searches for interesting patterns/rules/associations in the multimedia database 102 based on user-specified mining criteria. For example, this includes: (a) generation of "typical" performance patterns of a group or for the entire group in the database; (b) discovery of patterns of performance, style, or strategy of an individual or group; (c) discovery of changes in the performance, style, or strategy of an individual during the course of an event or over a longer period of time; and (d) determination of differences in performance, style, or strategy between multiple individuals or deviation of an individual from the typical behavior.

Figure 2:
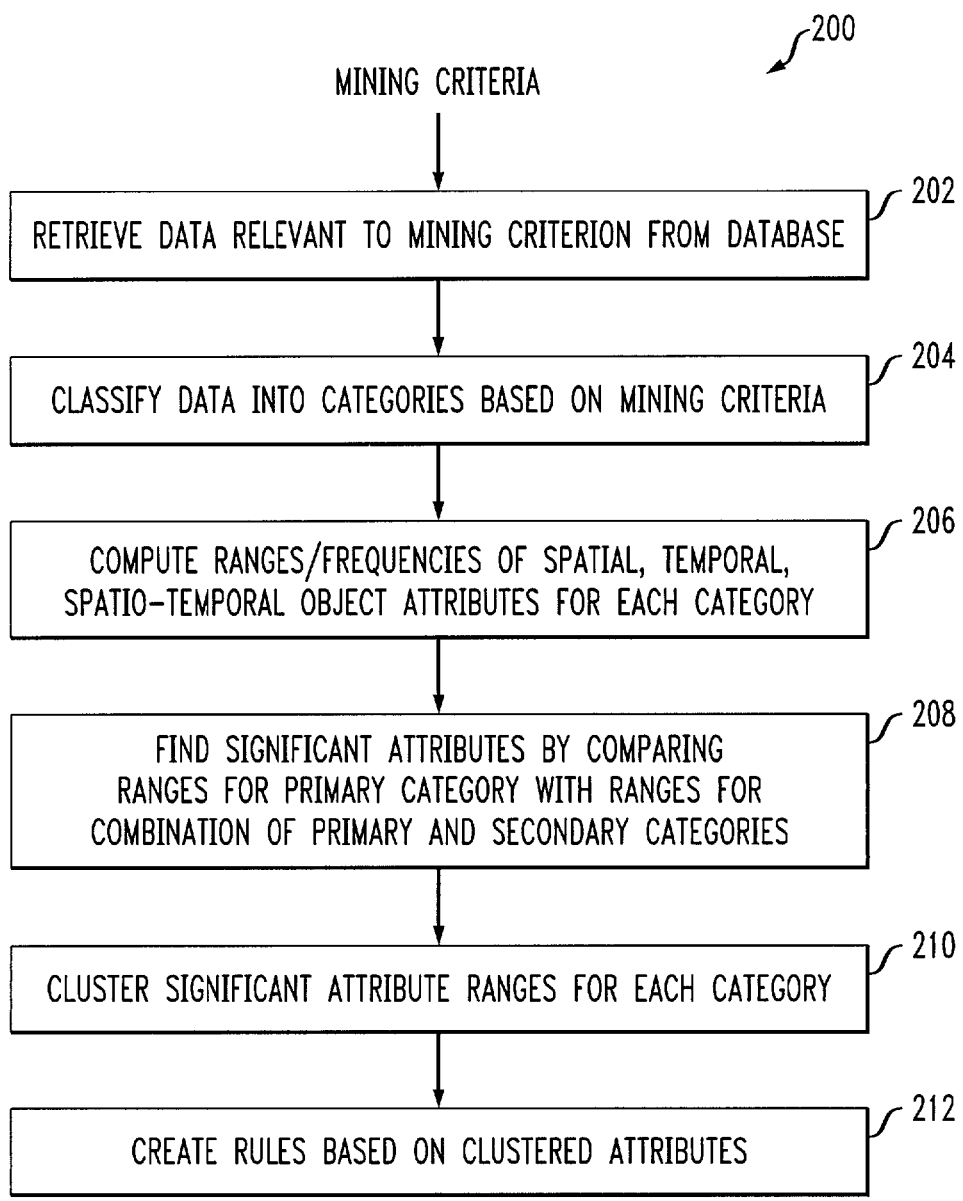
FIG. 2 is a flow diagram illustrating pattern discovery and rule creation via a mining engine from data in a multimedia database according to an embodiment of the present invention.

Referring now to FIG. 2, a flow diagram illustrates pattern discovery and rule creation via the mining engine 108 from data in the multimedia database 102 according to an embodiment of the present invention. The mining engine 108 searches for patterns based on specified mining criteria. These criteria are provided by the user through the graphical user interface 112, as shown in FIG. 1.

In a tennis application, for example, where the multimedia data stored in the database 102 relates to activities associated with a tennis match captured by the sensor system 106, the mining criterion could be "Sampras winning" or, more specifically, "Sampras winning against Agassi," or "comparison of Sampras and Agassi on setpoints."

The pattern discovery and rule creation process 200 of FIG. 2 operates as follows. Based on the specified criterion, in step 202, the mining engine 108 first retrieves relevant data from the multimedia database 102. This data includes the spatial, temporal, spatio-temporal motion, event tags, and other object attributes, as mentioned above.

In step 204, the mining engine 108 classifies the retrieved data into categories based on the mining criteria. For example, two kinds of data may be retrieved by the mining engine 108. The first is data that falls in the category specified in the mining criterion, and the second is data that serves as a negative example for the specified criterion, i.e., relevant data in other categories. For example, if the specified criterion is "Sampras winning," the mining engine 108 retrieves all points won by Sampras as the primary category, and points lost by Sampras and points won by other players, as the related secondary categories.

Next, in step 206, the mining engine 108 computes the ranges and frequencies of data attributes for the primary as well as secondary categories. For example, some of the attributes of the primary category may be "service speed 100-110 mph 50 times, 110-120 mph 60 times, . . . " "service bounce angle 20 to 25 degrees 10 times, service bounce angle 30-35 degrees 63 times, . . . ," "rally finished in grid box with corners (20,15), (25,20) 20 times, . . . ," "end speed 12 to 14 mph 32 times, 14 to 16 mph 26 times . . . ." Similarly, ranges and frequencies of attributes are computed for the secondary categories as well.

In step 208, the mining engine 108 chooses significant attributes that are associated with the outcome in the primary category. To do this, the mining engine 108 checks if the percentage of the frequency of an attribute range in the primary category to the frequency of the same attribute range in the combination of primary and secondary categories is significantly high (e.g., at or above a threshold percentage). For example, if the attribute "service bounce angle 30-35 degrees" occurs 63 times in points won by Sampras (the primary category), and occurs 11 times in points lost by Sampras (secondary category), this is selected as a significant attribute, as Sampras wins 63 out of 74 times (85% of the time) when he serves with a bounce angle between 30 to 35 degrees.

Next, in step 210, the mining engine 108 clusters the discovered significant attributes based on co-occurrence. In this step, the mining engine 108 essentially checks if a combination of attributes leads to the outcome in the primary category. Some attributes might cluster well with other attributes, while others might stand on their own. For instance, the bounce angle attribute might stand alone, while another attribute "service landing within 6 inches of backhand corner" might cluster with attributes "follow through shot at +10 to +15 degrees angle," and "opponent player left-handed."

Lastly, in step 212, the mining engine 108 uses the results of the clustering process of step 210 to formulate rules/interesting patterns. For example, the rules may be "Sampras wins 85% of the time when serving with a bounce angle between 30 to 35 degrees," "Sampras wins 60% of points against left-handed opponent by serving within 6 inches of backhand corner and with a follow through shot at a +10 to +15 degrees angle," etc. Each rule has an associated time period corresponding to the time period of the data used in deriving the rule. This is particularly important when rules are updated, or a new rule search is performed. The discovered rules are stored in the mining results store 110, as well as output to the user via the graphical user interface 112.

The time period associated with the rule ensures that the mining process is not repeated on data that has already been examined in previous rule creation. This is further indicated in FIG. 3, which indicates a typical process 300 followed by the mining engine 108.

Figure 3:
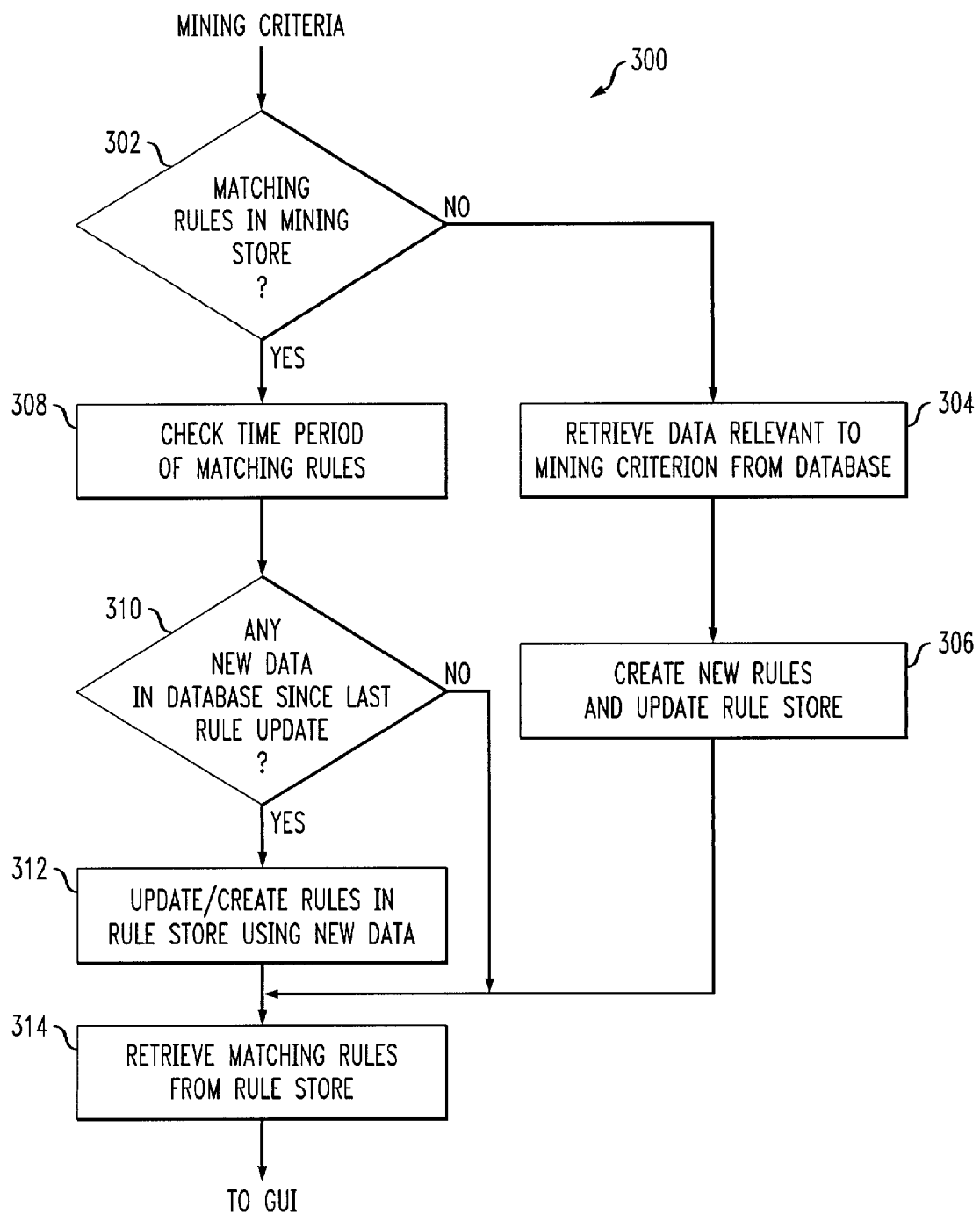
FIG. 3 is a flow diagram illustrating dynamic output of rules to a graphical user interface based on user-specified mining criteria according to an embodiment of the present invention.

As indicated in FIG. 3, when the mining engine 108 receives a mining criterion, the engine first checks, in step 302, if there are already any rules in the mining store 110, corresponding to the specified criterion. If there are none, a complete mining process is conducted in steps 304 (retrieve relevant data based on criterion) and 306 (create new rules and update rule store), which summarily correspond to the process described above in the context of FIG. 2.

If there are matching rules in the store 110, the engine 108 checks the time period of the data for these rules (step 308), and then checks if there is any relevant data in the database since the last rule update (step 310). If so, in step 312, the engine: (a) searches the new data for the significant attributes discovered in previous rules, and updates the previous rules with new statistics based on the recent data (for example the rule "Sampras wins 85% of the time when serving with a bounce angle between 30 to 35 degrees" may be updated to "Sampras wins 78% of the time when serving with a bounce angle between 30 to 35 degrees"); (b) searches the new data, as in FIG. 2, to determine if there are any newly significant attributes, and creates new rules based on these attributes.

Lastly, whether updated rules or new rules are generated and stored as explained above, rules matching the mining criteria are retrieved from the mining results store 110 and provided to the graphical user interface 112, in step 314.

The mining engine 108 also generates advice/success recipes based on user-specific criterion. This includes both static advice and dynamic advice based on ongoing real time analysis of performance of an individual or multiple individuals including opponents.

Figure 4:
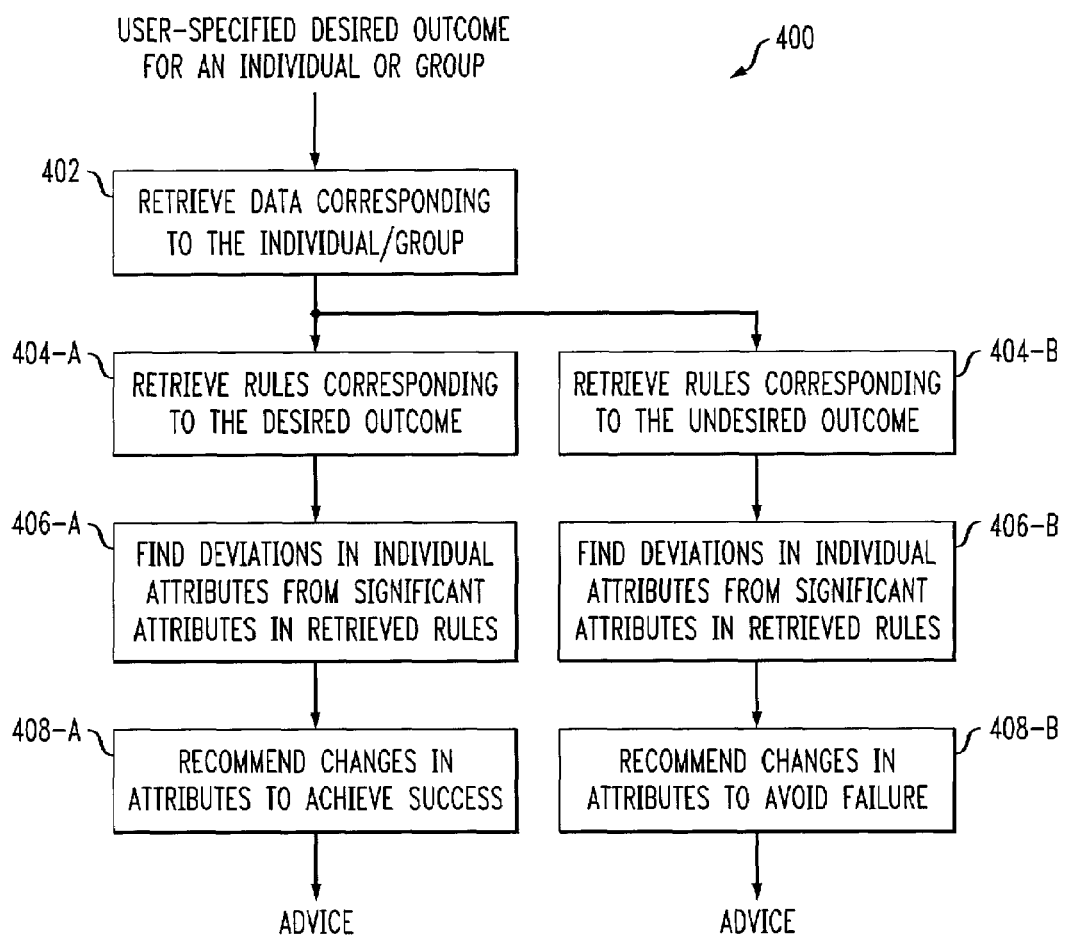
FIG. 4 is a flow diagram illustrating advice generation via a mining engine according to an embodiment of the present invention.

Referring now to FIG. 4, a flow diagram illustrates advice generation via a mining engine according to an embodiment of the present invention. The automated advice generation process, as other mining processes associated with the invention, is typically driven by user-specified criterion. For advice generation, the criterion is typically specified as a desired outcome for an individual or group. The criterion may, for example, be "winning against Sampras" or more specifically "advice for Hewitt to win against Sampras."

Thus, in accordance with the advice generation process 400 of FIG. 4, the mining engine 108 retrieves data from the database corresponding to the individual/group seeking advice, in step 402. In this example, the engine would first retrieve data for Hewitt.

Next, the mining engine 108 retrieves existing rules corresponding to the desired outcome (step 404-A), as well as rules corresponding to the undesired outcome (step 404-B). If there are no rules, the engine first creates rules as indicated in FIG. 2. In this example, the engine retrieves rules for the desired outcome "points won against Sampras," as well as rules on the undesired outcome "points lost to Sampras." These rules typify how most players have won against or lost to Sampras.

In the next step, the mining engine 108 identifies significant deviations in attribute ranges of the data for the individual/group with the identified significant attributes in the rule, either for a desired outcome (step 406-A) or an undesired outcome (step 406-B). For example, a rule for winning against Sampras may be "players won 70% of the time by hitting service return to the box with corners (−10,5) (−15, 10)," while the data for Hewitt indicates "4% of service returns by Hewitt land in the box with corners (−10,5) (−15, 10)." It is to be understood that these numbers in parentheses represent coordinates in the 3D model of the court (environment) stored in the database. Similarly, a rule for losing to Sampras may be "players lost 60% of the time when their end-position was in box (20,30) (10,40)," while Hewitt's data indicates "32% of Hewitt's end positions are in box (20,30) (10,40)".

Finally, the mining engine 108 generates advice on "things to do" and "things to avoid" based on the rules for the desired outcome (step 408-A) and the undesired outcome (step 408-B). For example, the mining engine 108 advises "Hewitt should hit the service return more often to the box (−10 5) (−15 10)," "Hewitt should avoid end position in box (20, 30), (10,40)".

The mining engine 108 also performs dynamic prediction by matching the current state of an individual/group/event with the mined patterns of performance.

Figure 5:
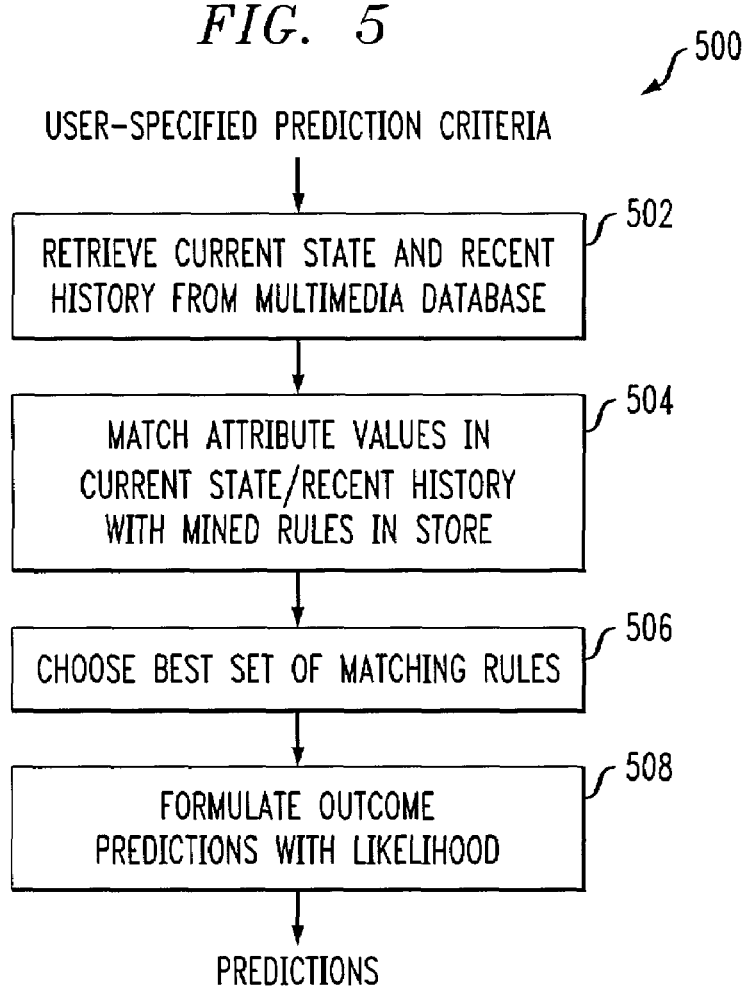
FIG. 5 is a flow diagram illustrating dynamic prediction via a mining engine according to an embodiment of the present invention.

Referring now to FIG. 5, a flow diagram illustrates dynamic prediction via a mining engine according to an embodiment of the present invention. That is, FIG. 5 illustrates an automated process 500 for predicting likely outcomes based on the previously mined rules.

As shown, in step 502, based on user-specified prediction criteria, the mining engine 108 first retrieves from the database the current state/relevant history for an ongoing event. The engine then compares current attribute values to the attribute values of relevant mined rules, in step 504. The engine then chooses the best set of rules that match the current state based on this comparison, in step 506. Lastly, in step 508, the engine predicts the likelihood of different outcomes.

It is to be appreciated that the mining engine can also provide data based on discovered patterns to an interactive visualization interface, and use user selections in the visualization to discover further interesting patterns. By way of one example, the invention may be employed with the techniques described in the concurrently filed U.S. patent application identified as Ser. No. 10/161,539 entitled "Method and Apparatus for Retrieving Multimedia Data Through Spatio-Temporal Activity Maps".

Further, it is to be appreciated that the mining engine can also retrieve multimedia data corresponding to mined patterns/rules. This is a very powerful feature provided by the performance mining engine. A user can choose to retrieve the underlying multimedia data contributing to a rule. For example, the user can choose the rule "Sampras wins 85% of the time when serving with a bounce angle between 30 to 35 degrees," and the system automatically retrieves all the video clips corresponding to the times when Sampras won when serving with a bounce angle between 30 to 35 degrees.

Figure 6:
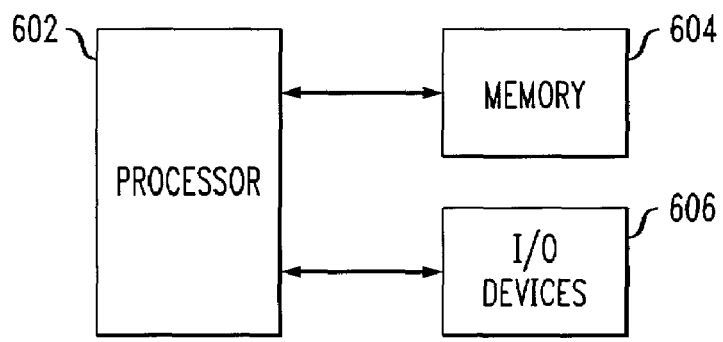
FIG. 6 is a block diagram illustrating a generalized hardware architecture of a computer system suitable for implementing one or more functional components of a performance data mining system according to the present invention.

Referring finally to FIG. 6, a block diagram illustrates a generalized hardware architecture of a computer system suitable for implementing one or more of the functional components of the performance data mining system as depicted in the figures and explained in detail herein. It is to be understood that the individual components of the system, e.g., as illustrated in FIG. 1, may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network. Also, the components of the system may be implemented in a client/server architecture, e.g., the GUI 112 implemented at the client and the mining engine 108 and store 110 being implemented at one or more servers. Also, the database 102 and tracker 104 may be implemented at the same or different servers as the mining engine 108.

As shown, the computer system may be implemented in accordance with a processor 602, a memory 604 and I/O devices 606. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. The memory 604 includes the memory capacity for implementing the multimedia database and mining results store. In addition, the term "input/output devices" or "I/O devices" as used herein is intended to include, for example, one or more input devices (e.g., cameras, microphones, keyboards, etc.) for entering data to the processing unit, and/or one or more output devices (e.g., speaker, display, etc.) for presenting results associated with the processing unit. It is also to be understood that the term "processor" may refer to more than one processing device and that various elements associated with a processing device may be shared by other processing devices.

Further, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Accordingly, as described in detail herein, the present invention provides many data mining features and advantages. For example, the invention provides automatic discovery of interesting performance patterns based on sensor analysis data, especially data on human motion, including articulated motion data, related to other data sources such as scores, etc. For instance, player A wins 95% of the time when moving limb X at angle t at velocity v when at distance z from the net; gymnast gets highest score when bending head an extra angle phi during third somersault at angular velocity between tau and omega; going to the net in a certain situation is advantageous; putting the serve in a particular area when opponent is X, etc. The invention also provides for automatic generation of advice on strategy, success and failure recipes based on automatic analysis of sensor data. The invention provides for automatic prediction of likely event/result based on real time analysis of sensor data, combined with archived sensor analysis data and other data. The invention also provides for continual advice/strategy generation through real time analysis of sensor data, combined with other data. This advice/strategy may be continually generated during the event. The invention further provides for display of discovered patterns in a visualization, which aids the user in interactively discovering further interesting patterns.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A processor implemented method of processing data associated with an event, the method comprising the steps of: maintaining data associated with the event, the data at least comprising sensor data captured in accordance with the event and analyzed, wherein the sensor data comprises motion data of one or more objects or one or more people associated with the event; and discovering that one or more attributes of the one or more objects or the one or more people are associated with an outcome of the event based on at least a portion of the captured and analyzed sensor data, and based on at least one user-specified criterion, wherein the one or more attributes are not predetermined to be associated with the outcome of the event, and wherein the one or more attributes relate to one or more measures of performance, style or strategy associated with an aspect of the event; and in response to user input, at least one of retrieving and presenting data corresponding to at least a portion of the one or more attributes.

2. The method of claim 1, wherein the sensor data is analyzed in real time.

3. The method of claim 1, wherein the maintained data further comprises pre-existing data associated with the event.

4. The method of claim 1, wherein the one or more attributes are discovered in real time during the event.

5. The method of claim 1, wherein the one or more determined attributes correspond to one or more rules.

6. The method of claim 5, wherein the one or more rules are updated based on at least one of newly obtained data and at least one new user-specified criterion.

7. The method of claim 5, wherein the one or more rules have a time period associated therewith.

8. The method of claim 1, wherein the one or more attributes are used to derive one or more recommendations associated with the event.

9. The method of claim 8, wherein the one or more recommendations are updated based on at least one of newly obtained data and at least one new user-specified criterion.

10. The method of claim 8, wherein the one or more recommendations are determined in real time during the event.

11. The method of claim 1, wherein the one or more attributes are used to derive one or more predictions associated with the event.

12. The method of claim 11, wherein the one or more predictions are updated based on at least one of newly obtained data and at least one new user-specified criterion.

13. The method of claim 11, wherein the one or more predictions are determined in real time during the event.

14. The method of claim 1, wherein the data associated with the domain-specific event is obtained from a database.

15. The method of claim 1, wherein the one or more measures are derived from the one or more attributes.

16. The method of claim 1, further comprising the step of deriving one or more visualizations of multimedia data corresponding to at least a portion of the one or more attributes.

17. The method of claim 1, further comprising the step of automatically determining one or more new attributes based on user interaction with one or more visual representations of the event.

18. Apparatus for processing data associated with an event, the apparatus comprising: a memory; and at least one processor coupled to the memory and operative to: (i) maintain data associated with the event, the data at least comprising sensor data captured in accordance with the event and analyzed, wherein the sensor data comprises motion data of one or more objects or one or more people associated with the event; and (ii) discover that one or more attributes of the one or more objects or the one or more people are associated with an outcome of the event based on at least a portion of the captured and analyzed sensor data, and based on at least one user-specified criterion, wherein the one or more attributes are not predetermined to be associated with the outcome of the event, and wherein the one or more attributes relate to one or more measures of performance, style or strategy associated with an aspect of the event: and (iii) in response to user input, at least one of retrieving and presenting data corresponding to at least a portion of the one or more attributes.

19. The apparatus of claim 18, wherein the sensor data is analyzed in real time.

20. The apparatus of claim 18, wherein the one or more attributes are used to derive one or more recommendations associated with the event.

21. The apparatus of claim 18, wherein the one or more attributes are used to derive one or more predictions associated with the event.

22. The apparatus of claim 18, wherein the one or more measures are derived from the one or more attributes.

23. An article of manufacture for processing data associated with an event, the article comprising a machine readable medium containing one or more programs which when executed implement the steps of: maintaining data associated with the event, the data at least comprising sensor data captured in accordance with the event and analyzed, wherein the sensor data comprises motion data of one or more objects or one or more people associated with the event; and discovering that one or more attributes of the one or more objects or the one or more people are associated with an outcome of the event based on at least a portion of the captured and analyzed sensor data, and based on at least one user-specified criterion, wherein the one or more attributes are not predetermined to be associated with the outcome of the event, and wherein the one or more attributes relate to one or more measures of performance, style or strategy associated with an aspect of the event; and in response to user input, at least one of retrieving and presenting data corresponding to at least a portion of the one or more attributes.

24. Apparatus for processing data associated with an event, the apparatus comprising: a data mining engine operative to: (i) retrieve data associated with the event, the data at least comprising sensor data captured in accordance with the event and analyzed, wherein the sensor data comprises motion data of one or more objects or one or more people associated with the event; and (ii) discovering that one or more attributes of the one or more objects or the one or more people are associated with an outcome of the event based on at least a portion of the captured and analyzed sensor data, and based on at least one user-specified criterion, wherein the one or more attributes are not predetermined to be associated with the outcome of the event, wherein the one or more attributes relate to one or more measures of performance, style or strategy associated with an aspect of the event; and an a user interface for presenting at least a portion of the determined one or more attributes to a user, and for receiving the user-specified criterion.

* * * * *

UNITED STATES PATENT AND TRADEMARK OFFICE
CERTIFICATE OF CORRECTION

PATENT NO. : 7,580,912 B2  Page 1 of 1
APPLICATION NO. : 10/167533
DATED : August 25, 2009
INVENTOR(S) : Carlbom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Fourteenth Day of September, 2010

David J. Kappos
*Director of the United States Patent and Trademark Office*